May 14, 1963 A. P. HUCHALA 3,089,672
UNDERCARRIAGE SAFEGUARD SYSTEM
Filed May 15, 1961
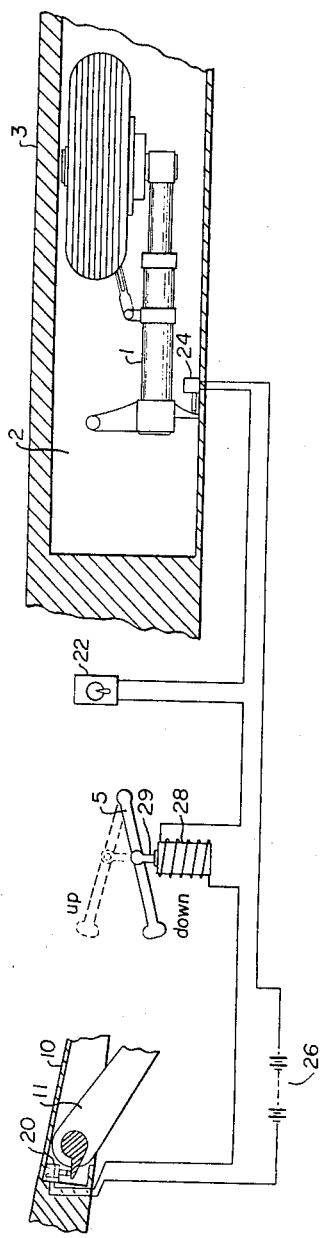
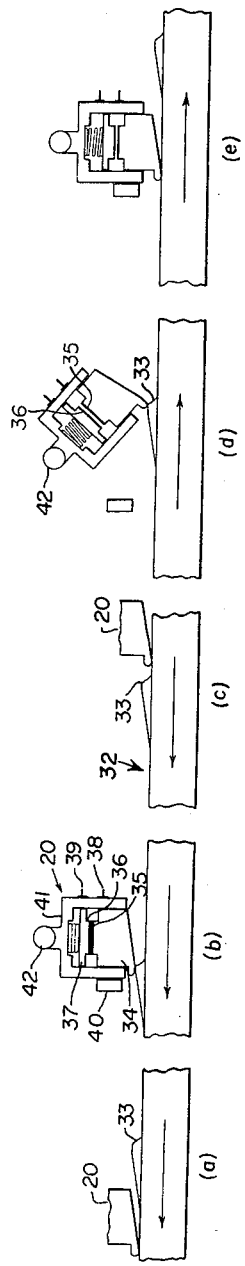
Inventor
Andrew P. Huchala
Cushman, Darby & Cushman
Attorneys

United States Patent Office 3,089,672
Patented May 14, 1963

3,089,672
UNDERCARRIAGE SAFEGUARD SYSTEM
Andrew P. Huchala, 158 Gloucester St., Ottawa,
Ontario, Canada
Filed May 15, 1961, Ser. No. 110,132
5 Claims. (Cl. 244—102)

This invention relates to a system for protecting aircraft from the danger of a "wheels-up" landing occasioned whenever a pilot omits to lower his undercarriage before landing.

It is well known that ever since aircraft have been provided with retractable undercarriages, there has always been a tendency for some landings to be made with the undercarriage in the "up" position. Various reasons have been given for the circumstances that lead to this, but it appears that the essence is that the pilot becomes distracted at a time when he would otherwise include the lowering of the undercarriage in the drill procedure followed for landing.

Aircraft have been landed "wheels-up" following an interruption of the normal progressive sequence of the landing drill functions which the pilot is ordinarily compelled to perform to execute a safe landing. Such interruptions might be caused by the local flying control agency in the process of scheduling aircraft for take-off and for landing. Of necessity there are a number of flying control instructions issued to approaching aircraft. Some are instructed to land quickly and turn off to clear the way, or to lengthen their down-wind leg, or to approach to land as number two or even number three. Other interruptions are due to the close proximity of aircraft in the circuit or on other approach paths. Control of these is contingent upon a progressive and controlled development of suitable positioning and separation of the approaching aircraft. Aircraft not properly positioned on the approach route with respect to other aircraft might be ordered to overshoot and go around again and others might be ordered to break off and proceed to a particular point in order to be rescheduled for another approach. Once a pilot has been thus distracted, he may sometimes abbreviate or telescope his drill functions for landing and neglects to lower the undercarriage and lands "wheels-up."

There are many other reasons which cause pilot distraction. His windscreen might ice up on a rapid descent and he cannot see forward. Atmospheric disturbances might interfere with his reception of control instructions. He may be under pressure of fuel shortage. He may be suffering from fatigue and frustration due to the above factors. He may even be upon the threshold of fear. In extraordinary conditions such as after a near miss, or excessive repetition of the landing procedure such as in a series of touch-and-go landings, or in many other situations involving fatigue, frustration, fear and repetition, the step of lowering the wheels can be forgotten.

Whilst this type of landing is seldom fatal to the pilot, it can often be very expensive because of damage to the structure of the aircraft when it scrapes the ground. Thus in a paper read in a recent annual conference of the Aero Medical Association held at Denver, Colorado, it was stated as a result of 56 special interviews conducted by U.S. Naval Flight Surgeons with pilots who made unintentional "Wheels-up" landings, none was fatal, two received serious injuries, four minor, and 73 received no injury at all. However, the cost of these fifty-six accidents was over three and a half million dollars in equipment alone.

In touch-and-go landings, it is believed that the neglect to lower the undercarriage is largely due to a psychological factor called "telescoping." This is a nearly universal tendency to omit steps from the sequence of required operations when the sequence is continually repeated. In a landing sequence the step frequently omitted is that of checking that the wheels are down and locked. Although every aircraft is provided with at least one means of indicating clearly to the pilot whether the undercarriage is in the "down" or "up" position, the result of this telescoping is that the pilot is convinced that he has lowered his undercarriage whereas in fact his conviction stems from an earlier sequence, where did he lower the undercarriage and he noted that it was down and locked as required.

The pilot can also neglect to lower his undercarriage by completely forgetting to include the steps of lowering and checking the position of the undercarriage. This omission is likely to occur when there is a sense of strain on the pilot, because it is a simple procedure requiring very little real attention from the pilot and it is easily forgotten, in contrast to the careful flying and trimming of the aircraft in the final stages of a landing approach, or the intent lookout and need for immediate reaction in bad weather conditions during the landing sequence. It should be noted that horn and other warning systems have been included in aircraft for some time, but nevertheless, these can be completely ignored and the pilot who is certain that his undercarriage is down and locked even though the horn is blowing in his ear is surprisingly frequent. That the inability to lower the undercarriage is due to psychological tension, is certainly strengthened by the figures of wheels-up accidents for jet aircraft which have almost two and a half times as many wheels-up incidents per ten thousand landings as propeller driven aircraft. A feature of jet aircraft is that although the pilot can often allow himself as much time to carry out his landing sequence as he could in a slower propeller driven aircraft, his reactions to unforeseen circumstances must be quicker in a jet aircraft because of its higher speed. Tension is therefore greater, and apparently his tendency to omit steps such as that of lowering the undercarriage is greater.

It is with these problems in mind that I have been led to the development of my invention, made possible as a result of a further discovery. In my investigations, it has become clear, that although pilots with considerable frequency omit to lower the undercarriage, the landing without lowering flaps almost never occurs. It is believed that the explanation is that there is an over-riding stimulus upon the pilot during his final approach to adopt the correct attitude, speed and descent for landing. The lowering of flaps is therefore an automatic reaction. The need to achieve a safe landing and the stimulus of self preservation is more than sufficient to cause him to attain the proper flight instrument readings and the proper position on the final approach, even though conditions of strain on the pilot may be very great. In very high winds flaps may not be used, but in this situation the knowledge of the need to land without flaps alerts the pilot in a special manner of the necessity to lower the wheels.

In accordance with the present invention, there is provided in an aircraft having a retractable undercarriage system and an actuable flap mechanism, the improvement which comprises, a switch operable upon attaining a flap position associated with landing trim of said aircraft, an operating control for said undercarriage system having a position for actuating said system to lower undercarriage and over-ride means for said operating control, said switch being connected to said over-ride means for moving the operating control into said position upon lowering of flap to said landing trim position by said flap mechanism when the operating control is not found in said position.

The description of one embodiment of my invention follows and reference will be made to the accompanying drawings in which:

FIGURE 1 shows a diagrammatic view of a system according to my invention;

FIGURES 2a, b, c, d, and e show details of one system of switch control by the flaps.

In FIGURE 1, the undercarriage 1 is shown in bay 2, of part of the underside of the aircraft 3. Operation of undercarriage 1 is executed in most aircrafts by hydraulic means controlled by a lever 5 in the cockpit of the aircraft. In some instances, the control of the undercarriage is electric, but there is always an operating lever provided for actuation by the pilot of the type such as shown at 5. In the cockpit an indicator is also provided for showing when the undercarriage is up or when it is partially in the lowered position and when it is down and locked in the position for landing. The aircraft wing is shown at 10 which has a simple flap 11 arranged to be lowered when a hydraulic or electric system complementary to that for the undercarriage is actuated by the pilot in the cockpit. The pilot is provided with a control (not shown) having three positions, one for lowering, one for holding the flap in any intermediate position and a third for raising the flap.

In practising the invention, a switch 20 is provided adjacent the flap, actuable at a certain position of the flap. As an example, suppose that in a particular wing profile the coefficient of drag begins to rise steeply when the angle of the flap exceeds 20° to the chord of the wing section in its normal position nested in the wing. Swtich 20 may then be arranged to be operated whenever the flap position exceeds twenty degrees. The point at which switch 20 operates will vary from five degrees of flap or even less up to full flap depending upon the aircraft type and upon the role of the aircraft. In the cockpit there is a cut-out switch 22 which is normally in the closed position. In the undercarriage bay 2, a further switch 24 is arranged to be contacted by a suitable part of the undercarriage gear so that it is closed when the undercarriage is in the wheels-up position. In some simplified installations it may be satisfactory to eliminate ths switch 24. When the undercarriage wheel leaves its bay, switch 24 is opened. In aircraft in which the undercarriage wheels normally follow a sequence of lowering, it may be preferable that switch 24 be operated by that wheel which is lowered first. The three switches, 20, 22, 24 are connected in series with the aircraft power system, shown as a battery 26, and a solenoid 28 having an armature 29 connected to lever 5. Solenoid 28 is normally unactuated, so that free up and down movement of lever 5 is possible at these times.

When the pilot carries out his normal landing procedure, he lowers the undercarriage before full flap is selected (he may have lowered some flap say about fifteen degrees at this time to improve the lift characteristics of the wing). Switch 24 is opened and further lowering of flap 11 although closing switch 20, passes no current through solenoid 28. If however, the pilot has forgotten to lower the undercarriage, switch 24 remains closed and the normal selection of full-flap or that amount of flap selected by the pilot and determined by his impulse to obtain the correct approach attitude of the aircraft, automatically actuates solenoid 28 which pulls in armature 29 and throws lever 5 into the "down" position. The aircraft hydraulic or electric system then lowers the undercarriage.

In FIGURE 2, a suitable structure for switch 20 and its cooperating flap mechanism is shown. Switch 20 is placed adjacent operating rod 32 for the flap on one of the wings. Mounted on rod 32 is a cam 33 which is arranged to depress fully detent 34 of switch 20 at the position where the flap is lowered by about 20° (or the position of the flap beyond which the coefficient of drag for the wing rises steeply and which produces the landing trim attitude for the aircraft at the correct approach speed). The detent 34 carries contact metal 35 which makes electrical connection with contact metal 36 carried by a spring loaded plate 37. The contacts of switch 20 are connected into the undercarriage lever lowering circuit through terminals 38 and 39. A stop 40 is provided for switch frame 41 which is suspended from hinge post 42. Further descent of the flap to its fully lowered position of 30°, or more, often required when very considerable drag is needed on the final approach is quite possible because the cam 33 is free to travel past switch 20 (see FIGURE 2c). A single electric impulse is developed by the circuit for lowering lever 5 when the flap has reached about 20° flap and after this no more current flows through the solenoid 28. When the flap is retracted the switch 20 pivots about post 42 against the action of a spring (not shown) without closing contact 35 and 36 so that there is no question of actuation of the control lever at this time. The switch 20 should be designed so that there is no danger of contact between metals 35 and 36 being made in any attitude or under any g-force experienced by the craft. With the switch in the upright position shown it would not tend to close under positive g-forces and detent 34 might be rubber encased or spring loaded to ensure that a negative g of as much as −25 could be tolerated without operation (this being the maximum accepted design figure for aircraft seats). Alternatively the switch could be oriented to take g loads on its side and then only acceleration and deceleration forces in the fore and aft direction need be allowed for.

The switch 20 might be varied from that shown and could be replaced by a torsion switch operated in accordance with the amount of rotation of flap 11 on its pivot or could be operated in accordance with the operation of any one of the accessories for the flap such as its rod connections, levers, driving gears, fluid pressures developed, electric current flow or instrumentation for showing the position of the flap.

Whilst a flap operated switch has been disclosed here, there are other ways in which the undercarriage lever operating pulse may be obtained and as examples the following conditions could be exploited for operating switch 20.

(a) It is known that the centre-of-pressure with respect to the wing moves forward as the angle-of-attack is increased. This feature is sometimes employed to open a complementary lift slot or an air deflection slat which is generally located near the leading edge of the wing. As this position also reflects the approach and the landing attitude of the aircraft, it can also be employed to move a miniature slat which would close a switch in place of switch 20 and thus lower the wheels for landing if they have been forgotten.

(b) It is known that a large pressure drop is occasioned in some areas behind the flap when it is lowered for landing. A suitable pressure sensing switch could be employed to sense that the flap has been lowered for landing and thus lower the wheels for landing if these have been forgotten.

(c) An altitude sensing device (either a pressure, radar or radio altimeter) could be designed to include an automatic or a manual adjustment to be adjusted by the captain to the height of the destination airfield above sea level. This combined with an additional input including a particular airspeed and a power setting generally used for landing could also be employed. Whenever the aircraft has reached the particular level above the landing field and it carried a particular airspeed and power setting compatible with the approach configuration, these inputs could be integrated into a pulse generating unit sufficient to excite the electric loop and thus lower the wheels for landing if these have been forgotten.

(d) It is known that the trim mechanism is used to position the trimtab within a particular position for landing. For a number of landing weights this particular position lies within a generally short length of trim run. This general length of trim run is usually used only for the approach and landing trim, hence it could be employed to excite the electric loop to lower the wheels, if these have been forgotten.

(e) It is known that there is a reversal of direction in the relative motion of the airflow within the dead-air region located at the forward part of the wings under-surface in the approach configuration. This can be employed to move a flap when placed in the particular air-flow associated with the approach and landing configuration, and thus excite the electric loop to lower the wheels if these have been forgotten.

(f) The position in space beneath the aircraft occupied by the undercarriage when it has been properly selected could be interrogated electronically after flaps have been lowered, and if the return from the undercarriage during such interrogation is absent, the wheels could be lowered automatically. Thus the interrogation system would replace switch 24.

In summary therefore, the system just disclosed has a very considerable advantage that only when the pilot has forgotten to lower the undercarriage by the time that he reaches the final stages of the landing procedure is this action carried out for him automatically. The cutout switch 22 in the cockpit ensures that, in a demonstration of forced landings on unprepared sites and in the use of full flap in flight such as to demonstrate its effect on spinning conditions of the craft, the undercarriage is not lowered unnecessarily.

This system has particular merit in not causing any deviation from known instructional flight training regulations and flight standards, since it does not affect the normal behaviour of the aircraft or normal operation of ancillary controls, except the undercarriage lever at the one time when it is essential that the undercarriage be lowered. The advantage of the system therefore in complementing present safety and operating procedures, without interfering with or causing them to be modified, will be apparent.

Although an electrical system for operating the lever 5 have been described, it could be replaced by a suitable hydraulic system in which fluid is supplied to move a piston connected to the lever 5 when full flap is lowered before selection of the lever. In those aircraft where the undercarriage selector has an additional movement, such as a quadrant indent to maintain it in a locked position, a mechanism to perform the necessary unlocking action, will be required. Such a mechanism could be triggered off by the system described in the specific embodiment by connecting the armature 29 to start the mechanism.

In certain cases, such as in a pitch out on the "break" during a jet approach in an aircraft capable of this manoeuvre the combined effect of automatic undercarriage lowering immediately after full flap might pose a trim problem for the pilot. On such aircraft where the amount of trim change needed in a short time is excessive, it would be desirable to incorporate a delay mechanism which delayed the lowering of undercarriage for some time after the detection that the flaps were in the landing position.

I claim:

1. In an aircraft having a retractable undercarriage system and an actuable flap mechanism, the improvement which comprises, a switch operable upon attaining a flap position associated with landing trim of said aircraft, an operating control for said undercarriage system having a position for actuating said system to lower undercarriage and over-ride means for said operating control, said switch being connected to said over-ride means for moving the operating control into said position upon lowering of flap to said landing trim position by said flap mechanism when the operating control is not found in said position.

2. A system as defined in claim 1 wherein said override means comprises a solenoid and an armature within the solenoid said operating control comprising an actuating handle, means coupling said armature to the handle for actuation of said handle upon operation of said switch.

3. A system as defined in claim 2 wherein said switch means comprises, a switch, a cam in the flap actuating mechanism, said switch and said cam being so shaped and arranged to actuate said switch upon engagement of said cam and said switch, the engagement occurring in the region of full flap.

4. A system as defined in claim 3 wherein the cam comprises a projection on a shaft in said flap mechanism said shaft being arranged to move said cam past said switch for actuation thereof as said flap system approaches the region of full flap position, said switch being mounted to remain firm upon actuation by the cam as said flap is lowered, but to pivot freely away from the cam as the cam strikes it upon raising of said flap, whereby said switch is unactuated by said cam upon raising said flap.

5. A system as defined in claim 2 including a cut out switch for preventing operation of said override means when said undercarriage has been lowered.

References Cited in the file of this patent

UNITED STATES PATENTS 2,293,198  Filmer _____ Aug. 18, 1942
2,331,108  DeGanahl _____ Oct. 5, 1943